United States Patent
Kamoi et al.

(10) Patent No.: US 6,262,787 B1
(45) Date of Patent: Jul. 17, 2001

(54) POLYMER FILM LIQUID CRYSTAL DISPLAY DEVICE

(75) Inventors: Sumio Kamoi, Tokyo; Isao Miyamoto, Yamato; Hisashi Kikuchi, Atsugi, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 08/897,418

(22) Filed: Jul. 21, 1997

(30) Foreign Application Priority Data

Jul. 19, 1996 (JP) .................................................. 8-209072

(51) Int. Cl.[7] .......................... G02F 1/1335; G02F 1/1333
(52) U.S. Cl. ............................ 349/96; 349/158; 349/122
(58) Field of Search ............................... 349/96, 122, 158

(56) References Cited

U.S. PATENT DOCUMENTS

| | | | |
|---|---|---|---|
| 4,025,688 | * 5/1977 | Nagy et al. | 349/96 |
| 4,526,818 | * 7/1985 | Hoshikawa et al. | 428/1 |
| 4,984,873 | 1/1991 | Takiguchi et al. | |
| 5,044,733 | 9/1991 | Kamoi et al. | |
| 5,513,026 | 4/1996 | Suzuki et al. | |
| 5,566,013 | 10/1996 | Suzuki et al. | |
| 5,568,290 | * 10/1996 | Nakamura | 349/96 |
| 5,579,138 | * 11/1996 | Sannohe et al. | 349/96 |
| 5,659,378 | * 8/1997 | Gessel | 349/96 |
| 5,751,453 | * 5/1998 | Baur | 349/96 |
| 5,753,140 | * 5/1998 | Shigemura | 349/96 |
| 5,783,299 | * 7/1998 | Miyashita | 349/96 |
| 5,818,559 | * 10/1998 | Yoshida | 349/96 |
| 6,051,289 | * 4/2000 | Tsujimoto et al. | 428/1 |

FOREIGN PATENT DOCUMENTS

| | | |
|---|---|---|
| 58-125002 | * 7/1983 | (JP) . |
| 63-64004 | * 3/1988 | (JP) . |
| 4-274216 | * 9/1992 | (JP) . |
| 6-67172 | * 3/1994 | (JP) . |

* cited by examiner

Primary Examiner—William L. Sikes
Assistant Examiner—Dung Nguyen
(74) Attorney, Agent, or Firm—Oblon, Spivak, McClelland, Maier & Neustadt, P.C.

(57) ABSTRACT

A liquid crystal display device which includes a liquid crystal layer formed between a pair of polymer film substrates. A pair of polarizing plates are formed on outer surfaces of each of the substrates. Moreover, a thickness of each of the substrates D ($\mu$m) and a thickness of each of the polarizing plates L ($\mu$m) satisfy D=L±30 $\mu$m. A thickness of protecting layers forming each polarizing plate may be 50 $\mu$m or less and a thickness of a polarizer of a polarizing plate may be 20 $\mu$m. A cohesive layer may be provided to attach each polarizing plate to the liquid crystal device, and such a cohesive layer may have a thickness of at least 50 $\mu$m. A spacer layer can be provided in conjunction with the cohesive layer.

9 Claims, 5 Drawing Sheets

POLYMER FILM LIQUID CRYSTAL DISPLAY DEVICE

BACKGROUND OF THE INVENTION

1. Field of the Invention

This invention relates to a PF-LCD (polymer film liquid crystal display device) which is a liquid crystal display device using substrates implemented by polymer films, and which particularly delimits a film composition and thickness of upper and lower polarizing plates and/or a thickness of a cohesive agent so as to improve irregularities of colors of the PF-LCD.

2. Discussion of the Background

FIG. 1 shows a background art apparatus of a PF-LCD. In this device in FIG. 1, two polymer film substrates 10 are provided. Further, a lower polarizing plate 16 is formed on a lower surface of a lower of the polymer film substrates 10. A reflective plate 19 is formed adjacent to the lower polarizing plate 16, on an opposite face as the shown lower polymer film substrate 10. An alignment layer 15 which includes transparent electrodes 17 is formed on a surface of the lower shown polymer film substrate 10. A central portion of the PF-LCD device includes a liquid crystal layer 13 and spacers 18. Formed above the upper shown polymer film substrate 10 is a phase plate 12 and then an upper polarizing plate 14.

A concern with such a PF-LCD device as shown in FIG. 1 is that a thickness of the liquid crystal layer 13 must be maintained to be even. If liquid crystal layer 13 is not maintained to have an even thickness, irregularities in color result from any unevenness in the thickness of the liquid crystal layer 13.

The device as shown in FIG. 1 utilizes polymer films for the substrates 10, and also particularly for the upper polarizing plate 14 and lower polarizing plate 16, to assure an ultra-thin and light weight design. However, the use of such polymer films for the upper polarizing plate 14 and the lower polarizing plate 16 results in such an upper polarizing plate 14 and lower polarizing plate 16 being somewhat flexible, in comparison with a device which may utilize a rigid glass structure. The utilization of polymer films for the upper polarizing plate 14 and lower polarizing plate 16 provides the benefits of the device of FIG. 1 being ultra-thin and light weight, but provides the drawbacks that variations in a liquid crystal layer 13 are more apt to occur, i.e., a thickness of the liquid crystal layer 13 may not be as uniform as desired.

One manner in addressing this issue, as disclosed in Japanese patent publication no. 06-67172, by the Applicants of the present application, is to include at least one layer of plastic film as a reinforcing plate at an outer layer of the PF-LCD panel to reduce any deformation of the panel, and thereby to reduce any nonuniformity of the liquid crystal layer 13. Such a deformation of the panel may be particularly appreciable from changes in temperature and humidity.

SUMMARY OF THE INVENTION

One object of the present invention is to provide a novel polymer film liquid crystal display device which can ensure a uniformity in a liquid crystal layer. In this way, the device of the present invention can improve irregularities of colors appearing on panels of the PF-LCD.

The present invention achieves these objectives by forming a novel liquid crystal display device which includes a liquid crystal layer formed between a pair of polymer film substrates. A pair of polarizing plates are formed on outer surfaces of each of the substrates. Moreover, in the present invention a thickness of each of the substrates D ($\mu$m) and a thickness of each of the polarizing plates L ($\mu$m) satisfy D=L±30$\mu$m.

Moreover, as a further feature of the present invention to achieve the above-noted objects, a thickness of protecting layers provided in each polarizing plate may be 50 $\mu$m or less and a thickness of a polarizer of each polarizing plate may be 20 $\mu$m.

As a further feature of the present invention to achieve the above-noted objects, a cohesive layer is provided to attach each polarizing plate to the liquid crystal device, and such a cohesive layer may have a thickness of at least 50 $\mu$m.

In a further structure of the present invention to achieve the above-noted objects, a spacer layer can be provided in conjunction with the cohesive layer.

BRIEF DESCRIPTION OF THE DRAWINGS

A more complete appreciation of the present invention, and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
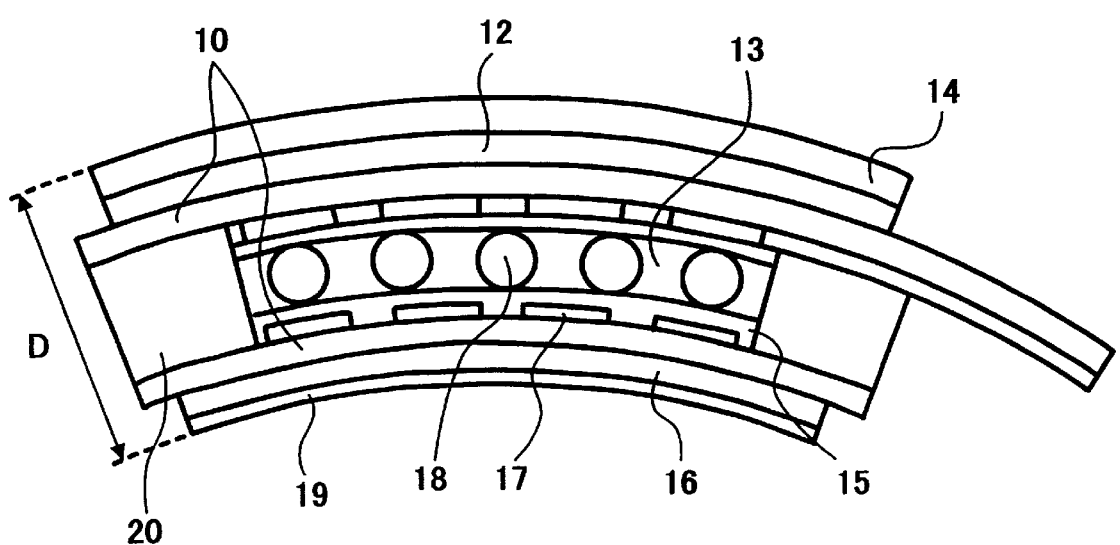
FIG. 1 shows a background polymer film liquid crystal display device.

Referring now to the drawings, wherein like reference numerals designate identical or corresponding parts throughout the several views, the present invention will now be described.

One object of the present invention is to prevent irregularities of colors from appearing on panels of a PF-LCD by ensuring that a liquid crystal layer remains uniform. The present invention particularly relates to utilizing novel polarizing plates in a device such as is shown in FIG. 1. That is, the present invention is directed to utilizing a novel upper polarizing plate for upper polarizing plate 14 in FIG. 1, and a novel lower polarizing plate for lower polarizing plate 16 in FIG. 1.

Color unevenness on panels of a PF-LCD appear because of changes of $\Delta n \cdot d$ ($\Delta n$: anisotropy of a refraction index of liquid crystal; d: a cell gap of liquid crystal) values resulting from unevenness of the cell gap d of liquid crystal. Particularly, for a LCD in a mode of STN (super-twisted nematic), severe cell gap control techniques are required due to color unevenness from even a small change of $\Delta n \cdot d$.

The accuracy of a cell gap required depends on a rate of duty, but irregularities should be on the order of ±0.1 $\mu$m or less.

Presently, there are two main types of liquid crystal display devices, one is a TN (twisted nematic) type and the other is a STN (super-twisted nematic) type. However, liquid crystal display panels of both of these types are almost the same in their construction, and a pair of polarizing plates are typically laminated on both sides of a cell containing liquid crystal in both of these types of liquid crystal display devices.

Figure 2:
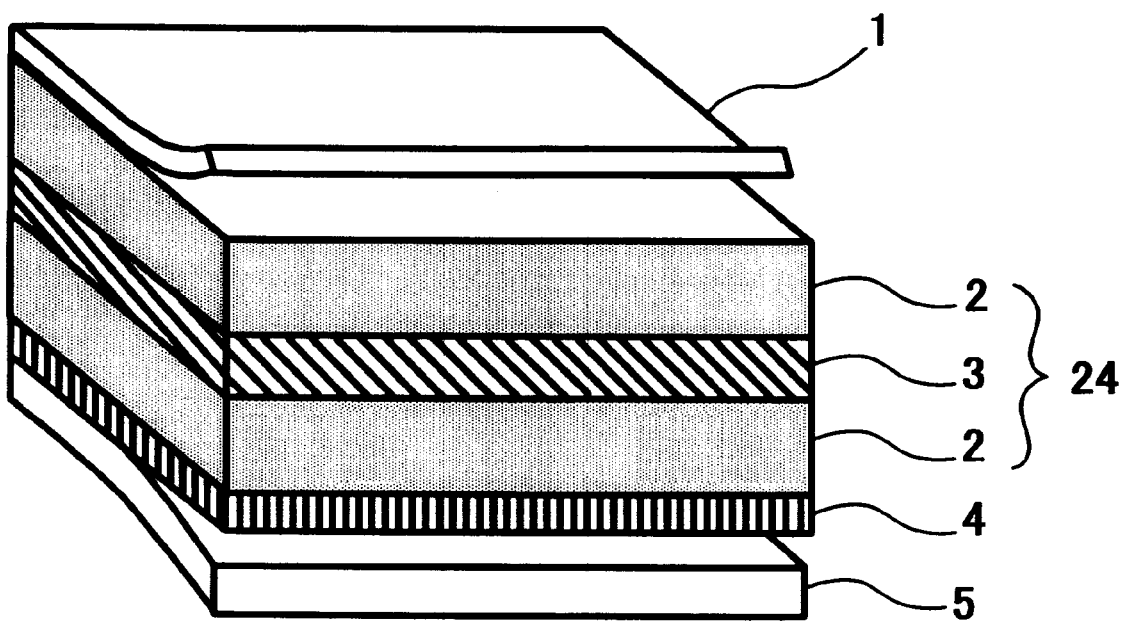
FIG. 2 shows a polarizing plate of a polymer film liquid crystal display device of one embodiment of the present invention.

As noted above, the present invention relates to respective upper and lower polarizing plates utilized a device such as is shown in FIG. 1. FIG. 2 of the present specification discloses one embodiment of an upper polarizing plate 24 of the present invention and FIG. 3 discloses one embodiment of a lower polarizing plate 26 of the present invention. In these embodiments of FIGS. 2 and 3, layer 1 is a protective film, layer 2 is a triacetate-cellulose (TAC) film, layer 3 is a polarizer, layer 4 is a cohesive agent film, layer 5 is a separator, and layer 19 corresponds to the same reflective plate as in FIG. 1 of the present specification. This layer 19 is shown attached to the lower polarizing plate 26 in FIG. 3, and thus FIG. 3 corresponds to a combination of a lower polarizing plate 26 and a reflective plate 19.

Figure 3:
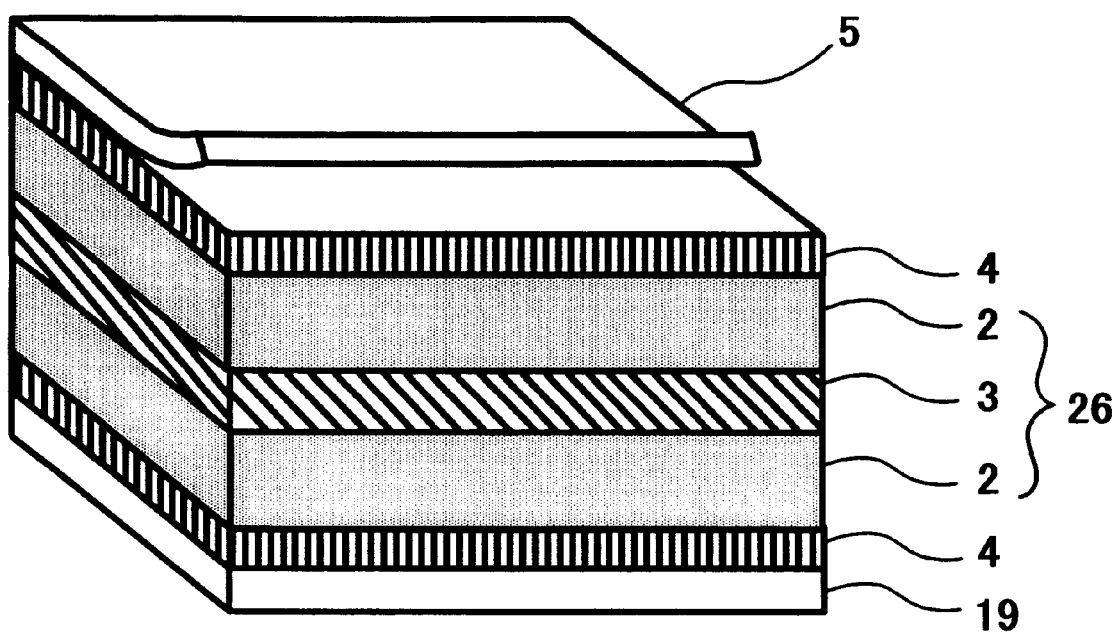
FIG. 3 shows a further polarizing plate of a polymer film liquid crystal display device of one embodiment of the present invention.
Figure 4:
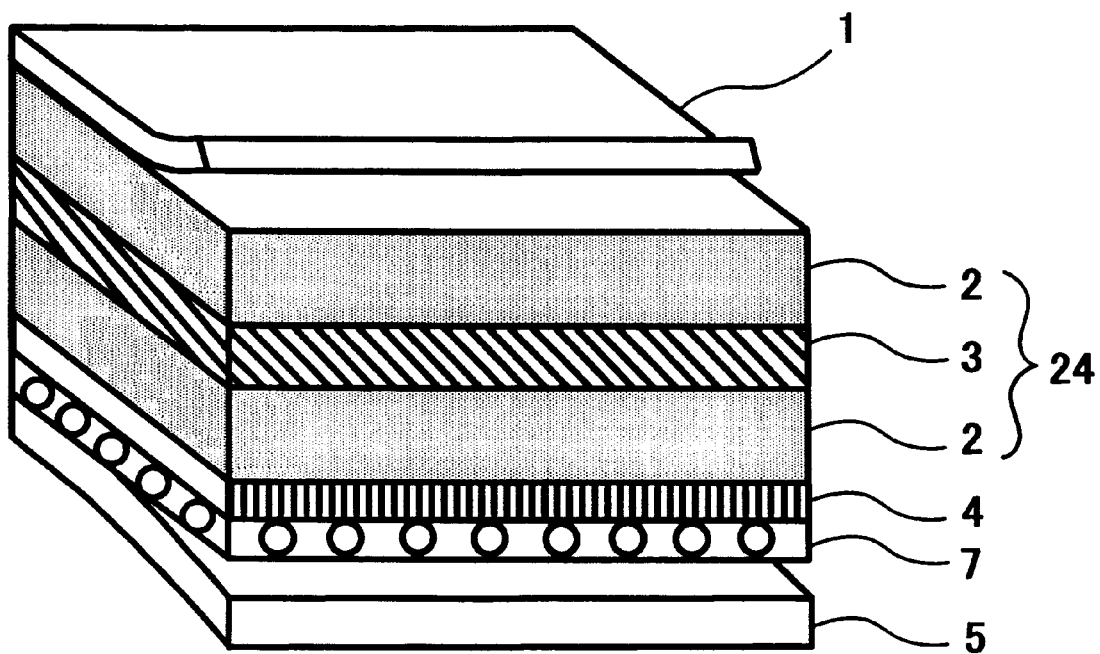
FIG. 4 shows a polarizing plate of a polymer film liquid crystal display device of another embodiment of the present invention.

The polarizing plates have two categories, one for a transparent type of polarizing film (as shown in FIG. 2) and another for a semi-transparent and reflection type of polarizing film (as shown in FIG. 3). Generally, triacetate-cellulose (TAC) films 2 are used with a polarizer 3 to form a polarizing plate, but films having three classes of single bodies of polarizing plates excluding cohesive and/or adhesive agents and additional structures (reflecting plates, semi-transparent plates, and so forth) having thicknesses of 120 $\mu$m, 180 $\mu$m, and 400 $\mu$m are manufactured as products. A thickness of these three types of polarizing plates depends on a thickness of the TAC films 2. When TAC films 2 (which function as protecting layers) are formed on both faces of a polarizer 3 having a thickness of 20 $\mu$m, a thickness of a polarizing plate typically becomes 120$\mu$m in a case of using triacetate-cellulose films 2 with a thickness of 50 $\mu$m, or 180$\mu$m in a case of using triacetate-cellulose films 2 with a thickness of 80$\mu$m, or 400 $\mu$m in a case of using triacetate-cellulose films with a thickness of 190 $\mu$m. A thickness of polarizer 3 is typically 20 $\mu$m.

On the other hand, polarizing plates using uniaxial oriented PET films for protecting layers (in place of the TAC films 2) have recently been on the market. Some of these polarizing plates have a thickness of around 100 $\mu$m. Polarizing plates using PET films are reliable, and enable to largely reduce decreasing and/or changing a polarizing degree at high temperature and high humidity.

The inventors of present invention have determined that a uniformity of the liquid crystal layer 13 can be enhanced by maintaining a specific relation between a thickness D of the polarizing plates 24, 26 and a thickness L of substrates 10. The inventors of the present invention have more specifically determined that if such a relation of the polarizing plate 24, 26 with a thickness of L ($\mu$m) and substrates 10 with the thickness of D ($\mu$m) are maintained to D=L+±30 $\mu$m, and particularly if the polarizing plates 24, 26 are made thinner, irregularities of colors in a PF-LCD can be reduced. An overall thickness of a plastic film substrate of a PF-LCD is generally 100 $\mu$m to 400 $\mu$m.

The reason why this invention has an effect as noted above is that a rigidity of a polarizing plate influences a cell gap of the liquid crystal 13. In other words, until the polarizing plates 24, 26 as shown in FIGS. 2 and 3 have been attached to the substrates 10, a cell gap of liquid crystal layer 13 is determined based on a particle size value of a gap solution and an injected dose of liquid crystal, and a surface tension of liquid crystal causes the substrates 10 to generate pulling forces inside toward the liquid crystal layer 13, and then the cell gap becomes stable. Nevertheless, attaching polarizing plates 24, 26 to the substrates 10 by a cohesive agent 4 allows the substrates 10 plus the polarizing plates 24, 26 to enlarge their rigidity (i.e. the force towards an outside of the liquid crystal layer 13), and enlarging their rigidity more than the surface tension of liquid crystal causes the cell gap to change. Consequently, the inventors of the present invention have determined that reducing the rigidity of polarizing plates 24, 26, or diminishing a thickness of polarizing plates 24, 26 causes the liquid crystal panel to decrease its irregularities of colors.

However, the inventors of the present invention have also determined that how a thickness of the polarizing plates 24, 26 is reduced may be significant. That is, diminishing a thickness of protecting layers for a polarizing plate (e.g., diminishing a thickness of TAC layers 2) for reducing a thickness of the polarizing plates 24, 26 too much may cause the polarizing plates 24, 26 to reduce their reliability, particularly to reduce a polarizing degree, or to deform at high temperature and high humidity.

As it is considered that an unevenness of colors on a PF-LCD and its reliability are in a trade-off relationship, the polarizing plates 24, 26 cannot be made to be much thinner than the substrates 10. Accordingly, it is better for the polarizing plates 24, 26 to be almost a same thickness as that of a substrate 10, or to be only slightly thinner (within 30 $\mu$m) than the substrates 10.

A thickness of a substrate 10 is determined in consideration of a LCD unit specification, adequacy of process, characteristics of panels, and so forth. Generally, a thickness of a substrate 10 is 100 to 150 $\mu$m, and a thickness of the polarizing plates 24, 26 should be determined based on this thickness. However, at present polarizing plates having thicknesses of 120, 180 and 400 $\mu$m only are on the market.

Nevertheless, polarizing plates can be further thinner, as stated above, by replacing materials of protecting layers with, for example, PET, or by changing a structure such as changing the protecting layers to, for example, one layer.

As the causes of irregularities of colors appearing on a PF-LCD, beside the rigidity of polarizing plates, surface characteristics of polarizing plates and a cohesive agent are considered. The surface smoothness of polarizing plates including that of a cohesive agent may be ±1 $\mu$m or more. Any irregularities of this surface are transcribed to the plastic substrates 10, which causes changes in the cell gap of the liquid crystal layer 13. The surface smoothness required is typically ±0.1 $\mu$m or less, but achieving this surface smoothness is very difficult according to the present methods of manufacturing polarizing plates. Even if a surface smoothness meets such a requirement, high manufacturing costs are expected. The present invention provides a further benefit of not requiring such a high surface smoothness. That is, in the present invention, even if the surface smoothness of the polarizing plates 24, 26 is not good, color irregularities do not appear, and thus reasonable manufacturing costs can be maintained.

As the cohesive agent 4 for attaching the polarizing plates 24, 26 to the PF-LCD, modacrylic materials on the market may be used. A thickness of cohesive layer 4 depends on the manufacturers, and is generally 20 to 30 $\mu$m. The inventors of the present invention have, however, determined that a cohesive layer 4 of such a degree of thickness may not fully absorb unevenness with a thickness of polarizing plates 24, 26, and as a result irregularities of colors are liable to appear.

Increasing a thickness of the cohesive layer 4 to 50 μm or more allows preventing irregularities of colors at a time of attaching polarizing plates 24, 26. Such an increasing of a thickness of cohesive layer 4 of course causes a gross thickness of a LCD panel to be thicker. Also, a thickness of cohesive layer 4 of not less than 50 μm and not larger than 150 μm is favorable, otherwise operational capabilities may become ineffective.

Figure 5:
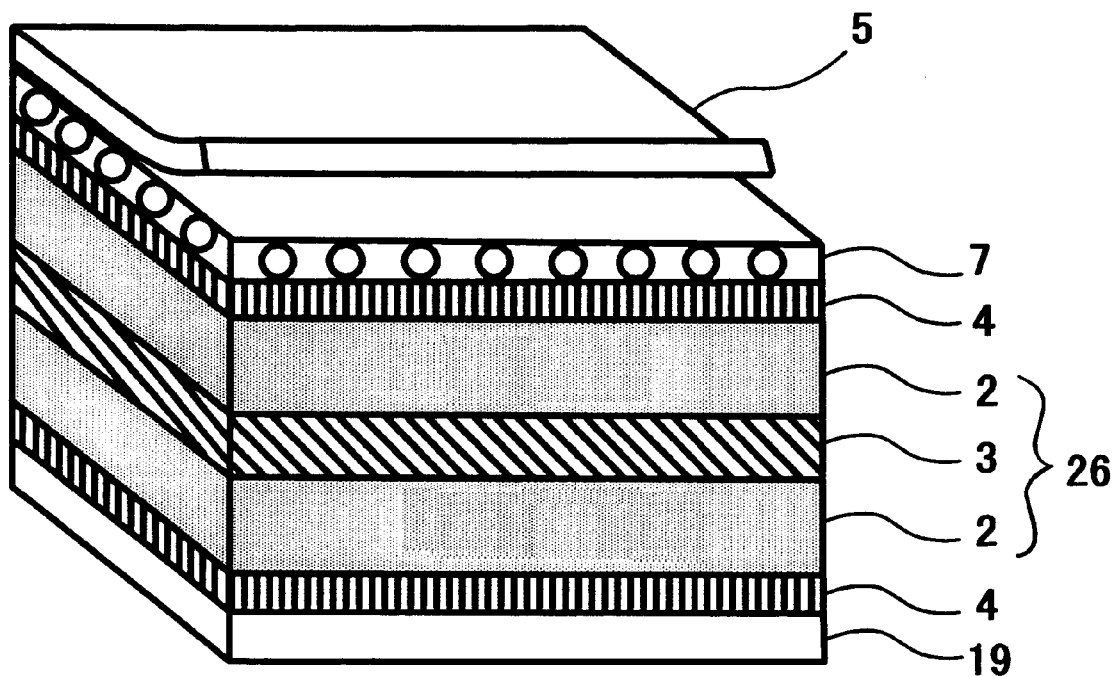
FIG. 5 shows a further polarizing plate of a polymer film liquid crystal display device of another embodiment of the present invention.

Moreover, in a further embodiment of the invention as shown in FIGS. 5 and 6, a spacer layer 7 (e.g. of 30 μm) may be placed between the polarizing plates 24, 26 and cell substrates to increase a gap between the polarizing plates 24, 26 and cell instead of increasing a thickness of the cohesive layer 4 to 50 μm. That is, in this further embodiment of the present invention, a thickness of the cohesive layer 4 is maintained at 20 to 30 μm and a spacer layer of 30 μm thickness is provided (for a total thickness of cohesive layer 4 and spacer layer 7 of 50 μm) to reduce the irregularities of colors. For the spacer layer 7, plastic or metallic oxide of globular, or cylindrical particles may be used. A diameter of the spacer layer 7 should be 30 μm or more. In a case of a diameter of a spacer in space layer 7 is 30 μm or less, irregularities of colors could not be improved.

In this way, in this further embodiment instead of utilizing a cohesive layer 4 of 50 μm thickness, a cohesive layer 4 of a thickness of 20 to 30 μm a spacer layer 7 of a thickness of 30 μm are combined. A total combined thickness of such a spacer layer 7 and cohesive agent 4 should be not less than 50 μm and not more than 150 μm.

This invention is intended to achieve an effect of reducing irregularities of colors by applying either one of the above-mentioned structures, and to further improve an effect of reducing irregularities of colors by combining either two or more of the above-mentioned structures.

Two separate specific examples of implementations of the present invention will now be described.

A first example of a n implementation of the present invention is as follows.

Film substrates 10 are first formed such that ITO electrodes of 100 Ω/□ has are formed on a polycarbonate film substrate made by a casting manufacturing method with a thickness of 100 μm or a film substrate with a gross thickness of 125 μm coating-processed of gas barrier layer or hard coat layer, are repatterning- processed by a known photo-litho method.

For an orientation agent, a soluble polymide solution (for example, AL3046 manufactured by Japan Synthetic Rubber Co.) is used, and is formed to a thickness of 0.1 μm by a flexographic press printing method, and is heated/formed at a temperature of 100° C. A rubbing process is executed so that a twist angle of the upper and lower substrates 10 can be 240° and a pre-tilt angle thereof can be 5° which will then be an orientation film.

For gap agents or spacers 18 within the liquid crystal 13 layer, plastic beads with a CV value of 2.2% and a particle diameter of 7.3 μm (for example, XC-730S manufactured by Natco Paint Co.) are used, and they are dispersed with a dispersing quantity of 300/400 pcs./mm². A conductive paste and boundary seal agent are printed, and the upper and lower substrates 10 are superposed, and are then pressurized and cured at a temperature of 60° C. After the acquired cell is heat-processed at a temperature of 120° C., liquid crystal 13 is injected. The liquid crystal injection was made by means of a vacuum injection method.

On a side of the upper substrate 10, a phase difference film 12 (for example, NRZ600 manufactured by Nitto Electric Industrial Co.) and a polarizing plate 24 with a thickness of 120 μm (including a protecting layer of TAC film 2 with a thickness of 50 μm, for example, NPF-1205Du manufactured by Nitto Electric Industrial Co. on both sides of a polarizer 3) were layered. At this time, layering of the upper substrate 10 and phase difference film 12 was implemented using a cohesive agent 4 with a thickness of 25 μm (for example, a standard cohesive agent manufactured by Nitto Electric Industrial Co.). On a side of the lower substrate 10, polarizing plate 26 with a semi-transparent plate with a thickness of the polarizing plate 26 of 120 μm (including a protecting layer of TAC film 2 with a thickness of 50 μm, for example, NPF-F4205P3 manufactured by Nitto Electric Industrial Co.) were layered. At this time, layering of the lower substrate 10 and the polarizing plate 26 with a semi-transparent plate was implemented using a cohesive agent 4 with a thickness of 50 μm (for example, a cohesive agent manufactured by Soken Chemical Industrial Co.).

A monochrome STN panel of 1/16 Duty acquired in the above manner eliminates minute irregularities of colors from the front and all visible directions at the time of power OFF, and further almost entirely eliminates irregularities of colors at the time of power ON, which makes a liquid crystal display device of extremely high quality.

A second example of an implementation of the present invention is as follows.

Film substrates 10 wherein ITO electrodes of 40 Ω/□ are formed on a polycarbonate film substrate made by a casting manufacturing method with a thickness of 125 μm or the film substrate with a gross thickness of 150 μm coating-processed of gas barrier layer or hard coat layer, are repatterning-processed by a known photo-litho method.

For an orientation agent, a soluble polyimide solution (for example, AL3046 manufactured by Japan Synthetic Rubber Co.) is used, and is formed to a thickness of 0.1 μm by a flexographic press printing method, and is heated/formed at a temperature of 100° C. A rubbing process is executed so that the twist angle of the upper and lower substrate 10 can be 240° and a pre-tilt angle thereof can be 5° which will then be an orientation film.

For gap agents or spacers 18 within the liquid crystal 13 layer, plastic beads with a CV value of 2.2% and a particle diameter of 6.2 μm (for example, XC-620S manufactured by Natco Paint Co.) are used, and they are dispersed with a dispersing quantity of 300/400 pcs./mm². A boundary seal agent is printed, and the upper and lower substrates 10 are superposed and are then pressurized and cured at a temperature of 60° C. After the acquired cell was heat-processed at the temperature of 120° C., the liquid crystal 13 is injected. The liquid crystal injection was made by a vacuum injection method.

On a side of upper substrate 10, a phase difference film 12 (for example, NRZ600 manufactured by Nitto Electric Industrial Co.) and a polarizing plate 24 with a thickness of 120 μm (including a protecting layer of TAC film 2 with a thickness of 50 μm, for example, NPF-I205Dumanufactured by Nitto Electric Industrial Co. on both sides of a polarizer 3) were layered. At this time, layering the upper substrate 10 and phase difference film 12 was implemented using a cohesive agent 4 with a thickness of 50 μm (for example, HJ-9150J manufactured by Nitto Electric Industrial Co.). On a side of the lower substrate 10, semi-transparent plates with a thickness of polarizing plate 26 of 120 μm (protecting layer with the thickness of 50 μm, for example, NPF-F4205P3 manufactured by Nitto Electric Industrial Co.) were layered. At this time, layering the lower substrate 16 and the phase difference film was made using a cohesive agent 4 with a thickness of 50 μm (for example, HJ-9150J manufactured by Nitto Electric Industrial Co.)

A monochrome STN panel of 240×320 (dots) acquired in the above manner eliminates minute irregularities of colors from the front and all visible directions at the time of power OFF, and further almost entirely eliminates irregularities of colors at the time of power ON, which makes a liquid crystal display device of extremely high quality.

This invention thereby enables acquiring a PF-LCD device of high quality with improved irregularities in colors on the PF-LCD.

Obviously, numerous additional modifications and variations of the present invention are possible in light of the above teachings. It is therefore to be understood that within the scope of the appended claims, the present invention may be practiced otherwise than as specifically described herein.

The present invention is based on Japanese patent application 08/209,072, the contents of which are incorporated herein by reference.

What is claimed as new and desired to be secured by Letters Patent of the United States is:

1. A liquid crystal display device comprising:
   a liquid crystal layer formed between a pair of inner surfaces of polymer film substrates;
   a pair of polarizing plates formed on outer surfaces of each substrate, wherein at least a thickness of each of said substrates D (μm) and a thickness of each of said polarizing plates L (μm) satisfy D=L or D−L≦30 μm; and
   a cohesive layer formed between each polarizing plate and each respective substrate, wherein the cohesive layer has a thickness of at least 50 μm.

2. A liquid crystal display device comprising:
   a liquid crystal layer formed between a pair of inner surfaces of polymer film substrates;
   a pair of polarizing plates formed on outer surfaces of each substrate, wherein at least a thickness of each of said substrates D (μm) and a thickness of each of said polarizing plates L (μm) satisfy D=L±30 μm;
   a cohesive layer formed between each polarizing plate and each respective substrate; and
   a spacer layer formed between the cohesive layer and each of the pair of polymer film substrates.

3. A liquid crystal device according to claim 2, wherein the spacer layer has a thickness of at least 30 μm.

4. A liquid crystal display device comprising:
   a liquid crystal layer formed between a pair of inner surfaces of polymer film substrates;
   a pair of polarizing plates formed on outer surfaces of each substrate, wherein at least a thickness of each of said substrates D (μm) and a thickness of each of said polarizing plates L (μm) satisfy D=L or D−L≦30 μm, wherein each polarizing plate includes a polarizer and two protecting layers, the two protecting layers formed (on respective opposite sides of the polarizer; and
   a cohesive layer formed between each polarizing plate and each respective substrate, wherein the cohesive layer has a thickness of at least 50 μm.

5. A liquid crystal display device comprising:
   a liquid crystal layer formed between a pair of inner surfaces of polymer film substrates;
   a pair of polarizing plates formed on outer surfaces of each substrate, wherein at least a thickness of each of said substrates D (μm) and a thickness of each of said polarizing plates L (μm) satisfy D=L±30 μm, wherein each polarizing plate includes a polarized and two protecting layers, the two protecting layers formed on respective opposite sides of the polarizer;
   a cohesive layer formed between each polarizing plate and each respective substrate; and
   a spacer layer formed between the cohesive layer and each of the pair of polymer film substrates.

6. A liquid crystal device according to claim 5, wherein the spacer layer has a thickness of at least 30 μm.

7. A liquid crystal display device, comprising:
   a liquid crystal layer formed between a pair of inner surfaces of polymer film substrates;
   a cohesive agent formed at outer surfaces of the pair of polymer film substrates, the cohesive agent having a thickness of not less than 50 μm and not larger than 150 μm; and
   a pair of polarizing plates formed on outer surfaces of respective of said polymer film substrates, each polarizing plate formed to contact the cohesive agent, each polarizing plate including a polarizer formed between two protecting layers, wherein at least a thickness of each of said polymer film substrates D (μm) and a thickness of each of said polarizing plates L (μm) satisfy D=L or D−L≦30 μm.

8. A liquid crystal device according to claim 7, wherein the protecting layers include TAC.

9. A liquid crystal display device comprising:
   a liquid crystal layer formed between a pair of inner surfaces of polymer film substrates;
   a cohesive agent formed at outer surfaces of the pair of polymer film substrates, the cohesive agent having a thickness of at least 50 μm; and
   a pair of polarizing plates formed on outer surfaces of respective of said polymer film substrates, each polarizing plate formed to contact the cohesive agent, each polarizing plate including a polarizer formed between two protecting layers, wherein at least a thickness of each of said polymer film substrates D (μm) and a thickness of each of said polarizing plates L (μm) satisfy D=L or D−L≦30 μm,
   wherein a thickness of each protecting layer of each polarizing plate is 50 μm or less and a thickness of each polarizer of each polarizing plate is 20 μm.

* * * * *